(12) United States Patent
Park et al.

(10) Patent No.: US 7,427,979 B2
(45) Date of Patent: Sep. 23, 2008

(54) POINTING APPARATUS AND METHOD (75) Inventors: Tae-suh Park, Yongin-si (KR);
Sang-goog Lee, Anyang-si (KR);
Sung-cheol Kim, Yongin-si (KR)

(73) Assignee: Samsung Electronics Co., Ltd., Suwon (KR)

( * ) Notice: Subject to any disclaimer, the term of this patent is extended or adjusted under 35 U.S.C. 154(b) by 772 days.

(21) Appl. No.: 10/935,239

(22) Filed: Sep. 8, 2004

(65) Prior Publication Data
US 2005/0052414 A1 Mar. 10, 2005

(30) Foreign Application Priority Data
Sep. 8, 2003 (KR) .................... 10-2003-0062780

(51) Int. Cl.
*G09G 5/00* (2006.01)

(52) U.S. Cl. .................... 345/156; 345/157; 345/158; 345/159; 345/160

(58) Field of Classification Search ................ 345/156, 345/157, 158, 159, 160
See application file for complete search history.

(56) References Cited
U.S. PATENT DOCUMENTS
5,638,092 A * 6/1997 Eng et al. .................... 345/158
2003/0142065 A1 * 7/2003 Pahlavan .................... 345/156

FOREIGN PATENT DOCUMENTS
JP 07-271506 * 10/1995

* cited by examiner

*Primary Examiner*—Richard Hjerpe
*Assistant Examiner*—Leonid Shapiro
(74) *Attorney, Agent, or Firm*—Sughrue Mion, PLLC

(57) ABSTRACT

Provided are a pointing apparatus and method. The apparatus, which inputs a pointing signal to a portable computer, includes an accelerometer outputting an acceleration signal in response to motion of the finger; and a signal processing unit sensing micro-collisions generated when the finger comes into contact with a predetermined contact surface and a rising signal generated when the finger is detached from the contact surface using the acceleration signal, sensing pointing motion of the finger lasting between the generation of the micro-collisions and the generation of the rising signal, and outputting the pointing signal.

19 Claims, 8 Drawing Sheets

POINTING APPARATUS AND METHOD

This application claims the priority of Korean Patent Application No. 2003-62780, filed on Sep. 8, 2003, in the Korean Intellectual Property Office, the disclosure of which is incorporated herein in its entirety by reference.

BACKGROUND OF THE INVENTION

1. Field of the Invention

The present invention relates to a pointing apparatus and method, and more particularly, to a pointing apparatus, which has a ring shape and is used as an input apparatus, like a touch pad, of a portable computer, and a pointing method using the same.

2. Description of the Related Art

A current operating system, which adopts a graphical user interface (GUI) and a mouse to use a desktop computer, accepts 2D GUI as a common user interface and requires a pointing apparatus for moving and activating a pointer to input a user's selections. A mouse, which is a typical input apparatus, has many advantages of stably moving on a flat plane, easily associating its 2-dimensional motion with 2-dimensional motion of a pointer, orthogonality between the directions of motion and clicking, and reflecting minute motions of a hand.

However, with the development of a computing environment toward laying great emphasis on mobility in spite of unchanging GUI, a handy pointing apparatus that supersedes a mouse has been steadily sought. In other words, the mouse needs a predetermined size due to its "grasp and move" feature, which limits mobility of the mouse. Therefore, an alternative pointing apparatus has been required.

To replace a mouse in portable computing circumstances, a touch pad by APPLE COMPUTER Co., and a track point by IBM Co., were developed. However, in the case of the touch pad, since a sensing membrane having a predetermined size or more is positioned on a palm-rest area, misinput caused by contact with a palm can occur during typewriting. Also, the touch pad is not applied to small-sized devices such as a PDA because it has some restrictions, such as space. On the other hand, the track point is installed in the center of a keyboard instead of a palm-rest area so that misinput during typewriting is prevented and an area occupied by the track point is minimized. Whenever a pointer starts drifting due to a sensor's drift, however, a reset operation should be performed. Also, the track point has less responsivity and precision than the touch pad. Further, since the "motion" operation is not in harmony with the "selection" operation due to the positions of a button and a pointing stick, it is difficult to perform some operations such as dragging.

Therefore, a pointing apparatus improving the foregoing problems is needed.

SUMMARY OF THE INVENTION

The present invention provides a pointing apparatus, which adopts an accelerometer to measure the motion of a finger, to convert the motion into a pointing signal, and to transmit the pointing signal to a portable computer, and a pointing method using the same.

According to an aspect of the present invention, there is provided a pointing apparatus, which inputs a pointing signal to a portable computer, comprising an accelerometer disposed on a finger and outputting an acceleration signal in response to a motion of the finger; and a signal processing unit sensing micro-collisions generated when the finger comes into contact with a predetermined contact surface and a rising signal generated when the finger is detached from the contact surface using the acceleration signal, sensing pointing motion of the finger lasting between the generation of the micro-collisions and the generation of the rising signal, and outputting the pointing signal.

According to another aspect of the present invention, there is provided a pointing method of inputting a pointing signal to a portable computer using a pointing apparatus mounted on a finger. The method includes receiving an acceleration signal in response to a motion of the finger; sensing micro-collisions generated when the finger comes into contact with a predetermined contact surface using the acceleration signal; sensing a rising signal generated when the finger is detached from the contact surface using the acceleration signal; and calculating a direction and a distance in which the finger moves from the moment the collisions occur until the rising signal is sensed.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown.

Figure 1:
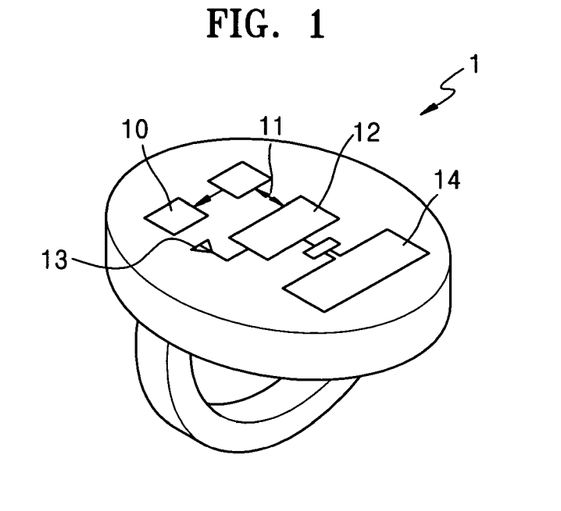
FIG. 1 schematically illustrates a pointing apparatus according to the present invention.

FIG. 1 schematically illustrates a pointing apparatus 1 according to the present invention. The pointing apparatus 1 includes an accelerometer 10, a signal processing unit, and a radio frequency (RF) module 12 connected to an antenna 13 for RF communications. The pointing apparatus 1 may further include an RF tag 14, an infrared sensor, or a storage portion (not shown) for buffering a signal output from the signal processing unit 11, if necessary. In an alternative embodiment, the reference number 14 refers to an infrared sensor 14.

The accelerometer 10, which is a 2-axis G-meter, measures motion of a finger and outputs x- and y-axis acceleration signals. The signal processing unit 11 decides whether the motion of the finger results from a user's intentional pointing motion or unintentional motion. If the decision is the intentional pointing motion, the signal processing unit 11 calculates and outputs a distance and a direction in which the finger moves. The RF module 12 converts the distance and direction output from the signal processing unit 11 into an RF signal and transmits the RF signal via the antenna 13 to a portable computer (not shown). The RF tag 14 or the infrared sensor, which may be optionally provided, senses the RF signal or an infrared ray transmitted from the portable computer and switches on or off an operation of the RF module 12. The RF tag 14 or the infrared sensor may be connected to the signal processing unit 11 instead of the RF module 12 and switch on or off an operation of the signal processing unit 11. If the RF module 12 is turned on due to the RF tag 14 or the infrared sensor, a pointing signal is generated in response to the motion of the finger and applied to the portable computer. A pointing region where the RF module 12 is turned on should be distinguished from a keyboard (not shown) for typewriting in the portable computer, and this will be described in more detail later.

Figure 2:
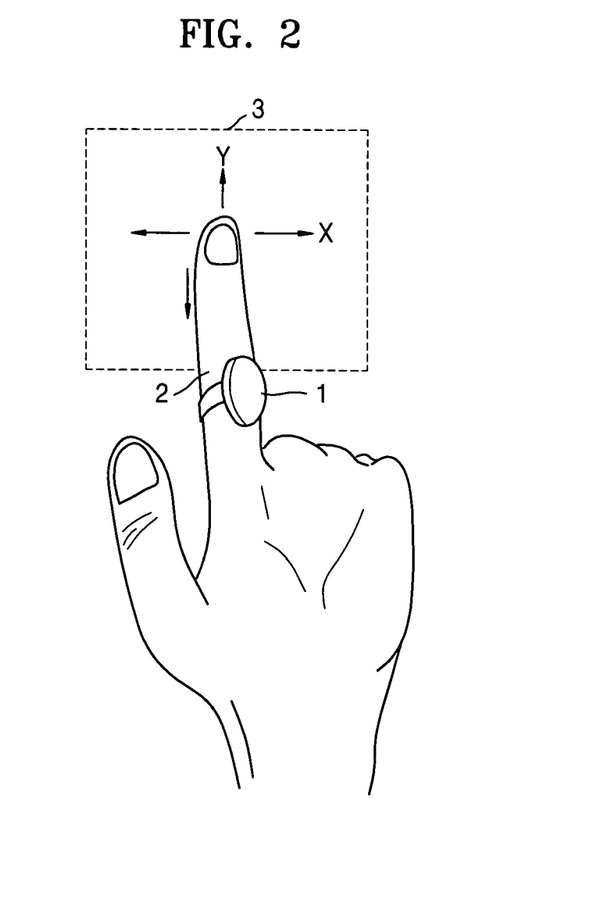
FIG. 2 illustrates the pointing apparatus of FIG. 1, which is worn on a finger.

FIG. 2 illustrates the pointing apparatus 1 of FIG. 1, which is worn on a finger. Referring to FIG. 2, the pointing apparatus 1 is worn on a user's finger 2, which moves around a pointing region adjacent to a portable computer, i.e., around a virtual touch pad 3. The virtual touch pad 3 operates just like a typical touch pad and is a region adjacent to the portable computer, where the finger 2 may come into contact with the virtual touch pad 3 and move around. Within the virtual touch pad 3, the pointing apparatus 1 can sense motion of the finger 2 and calculate and transmit a direction and a distance in which the finger 2 moves to the portable computer.

Assuming that the virtual touch pad 3 exists on an arbitrary plane, for example, on the surface of a desk, the user wears the pointing apparatus 1 on the finger and inputs a pointing signal to the portable computer by rubbing the finger against the surface of the virtual touch pad 3. Specifically, measurement of motion of the finger 2 is activated from the moment the finger 2 contacts the virtual touch pad 3 as a starting point and stopped in the instant the finger 2 is detached from the surface of the virtual touch pad 3 and a rising signal is sensed. In this process, it is possible to distinguish intentional pointing from unintentional motion in the same manner as when a mouse is employed.

To use the pointing apparatus 1, the following technical objectives should be attained. Firstly, a direction and a distance in which a finger moves should be calculated by measuring motion of the finger using an accelerometer. Secondly, it is necessary to decide whether the motion of the finger is intentional or unintentional. Thirdly, pointing should be distinguished from typewriting.

It is known to those skilled in the art that a direction and a distance in which a finger moves are calculated based on an acceleration signal from an accelerometer 10. However, the drift phenomenon impedes long-term use of the accelerometer 10. To overcome such a drawback, the present invention intermittently uses an acceleration signal from the accelerometer 10 under the assumption that touching the virtual touch pad 3 directly reflects the user's intention like when the user touches a typical touch pad.

Figure 3:
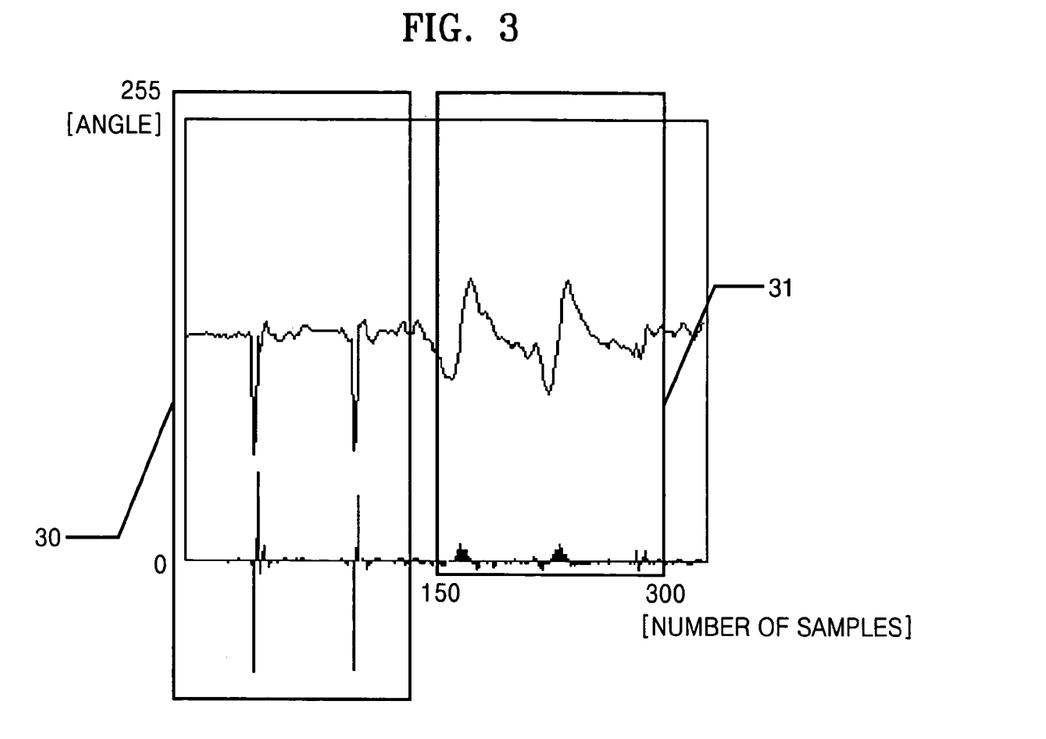
FIG. 3 illustrates a waveform of a y-axis signal of the accelerometer.

To discern whether the finger 2 is moved intentionally or unintentionally, the pointing apparatus 1 senses whether or not a micro-collision occurs from an output signal of the accelerometer 10. The micro-collision occurs when the finger 2 contacts a surface of the virtual touch pad 3. Once the micro-collision is sensed, the measurement of the pointing signal is activated until the finger 2 leaves the surface of the virtual touch pad 3. More specifically, the accelerometer 10 generates a peak signal caused by the micro-collision at the moment the finger 2 comes into contact with the virtual touch pad 3. FIG. 3 illustrates a waveform of a y-axis signal of the accelerometer 10 in case 30 where the finger 2 touches the surface of the virtual touch pad 10 twice and in case 31 where the finger 2 moves in the air twice, respectively. Signal waveforms illustrated in the bottom of FIG. 3 are obtained by preprocessing respective signals output from the accelerometer 10 to facilitate sensing. Referring to FIG. 3, it can be seen that case 30 is definitely different from case 31, and an acceleration signal generated in response to motion of the finger 2 overlaps a peak signal caused by micro-collisions. Accordingly, acceleration information can be estimated by sensing an amount of time for which the peak signal is generated and compensating for a sensing signal of the accelerometer 10 during an activation period.

However, this method is not very reliable for detecting a rising signal pattern at the moment the finger 2 leaves the surface of the virtual touch pad 3. Thus, in the present invention, a timeout is applied to the activation period so that the activation period comes to an end compulsorily after a lapse of a predetermined amount of time, for example, after several to several tens of ms. This timeout is required to prevent sensing errors from occurring due to continuance of the activation period when detection of the rising signal pattern fails.

In the meantime, the present invention requires no additional sensor for detecting a z-axis signal of the accelerometer 10. The reason will be described with reference to FIG. 4.

Figure 4:
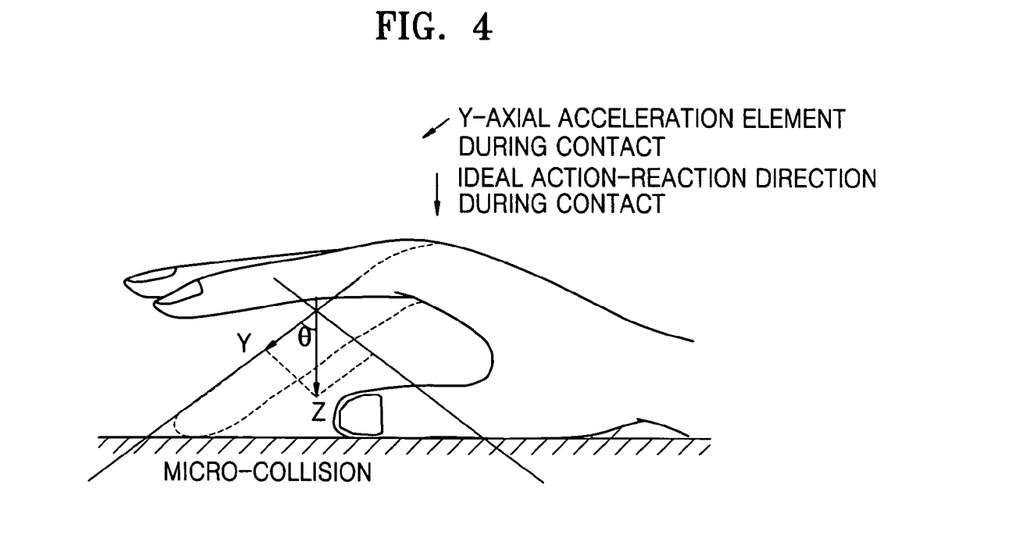
FIG. 4 illustrates a hand being put on a flat surface while a finger is moving downward.

FIG. 4 illustrates a hand being put on a flat surface while a finger is moving downward. Referring to FIG. 4, the finger rotates up and down about an axis of a joint between a hand body and the finger. Accordingly, from the moment a tip of the finger contacts the virtual touch pad 3 to move in the same manner as when the finger touches a typical touch pad, a micro-collision occurs. At this time, a z-axis element of a peak signal caused by the micro-collision is projected theoretically by $y=z\cos\theta$ on a y-axis. Thus, the micro-collision, which is originally z-axial motion, can be detected from a y-axis signal of the accelerometer 10.

Figure 5A:
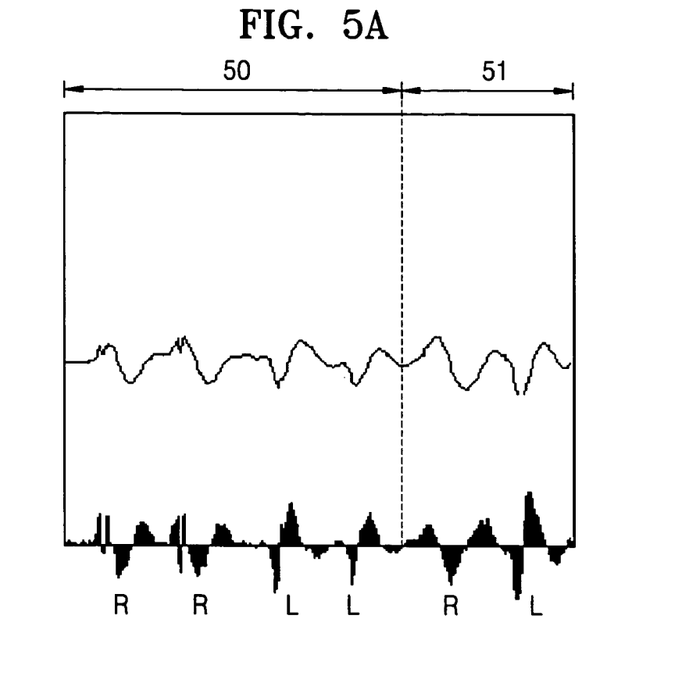
FIGS. 5A and 5B illustrate respective waveforms of x- and y-axis signals of the accelerometer when a finger moves from left to right.
Figure 5B:
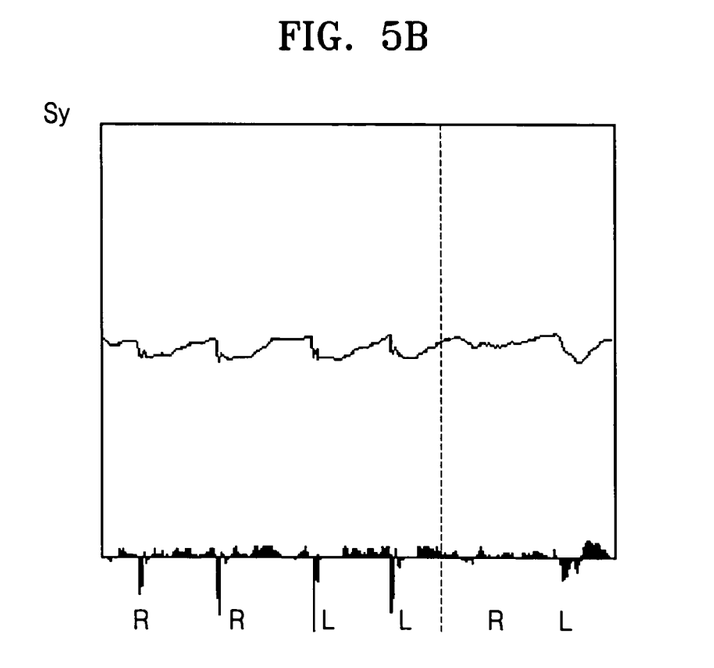
Figure 6A:
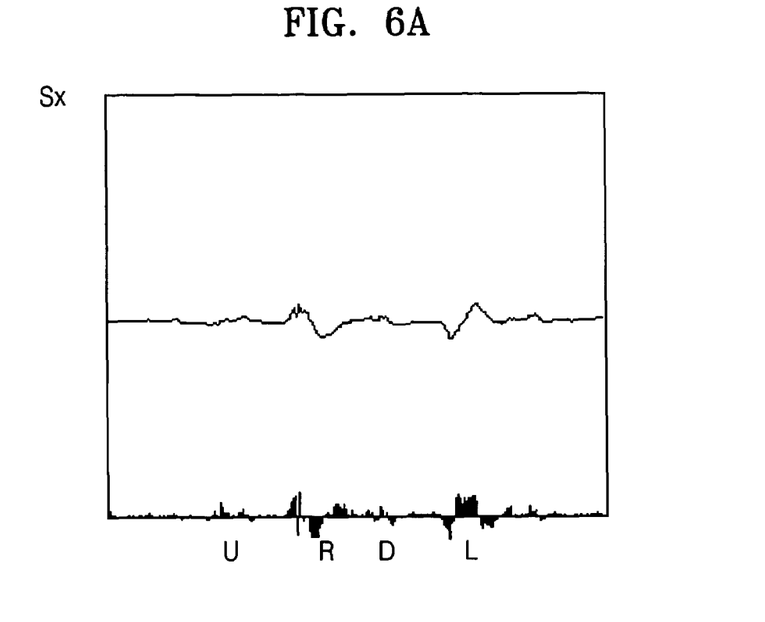
FIGS. 6A and 6B illustrate respective waveforms of x- and y-axis signals of the accelerometer when a finger moves up and down.
Figure 6B:
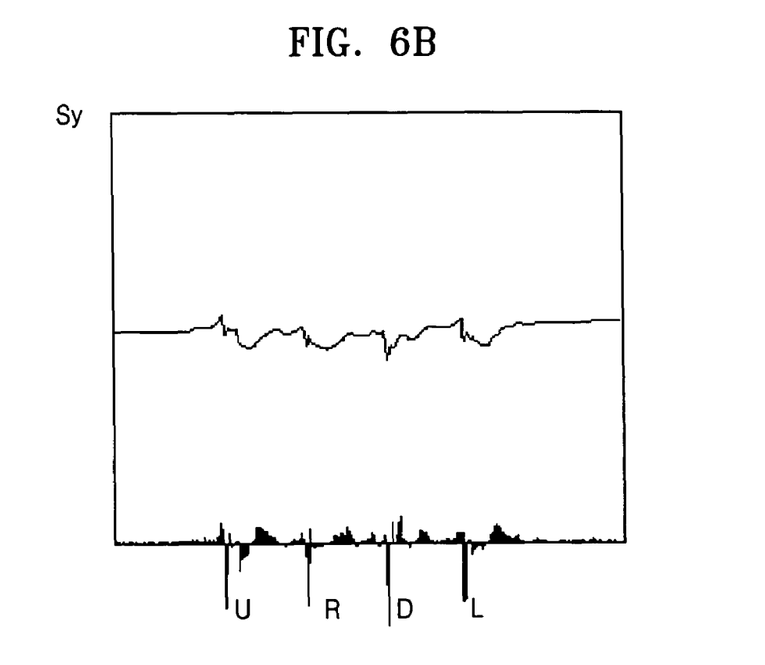

FIGS. 5A and 5B illustrate respective waveforms of x- and y-axis signals of the accelerometer 10 when a finger moves from left to right several times. FIGS. 6A and 6B illustrate respective waveforms of x- and y-axis signals of the accelerometer 10 when a finger moves up and down from left to right only once. In FIGS. 5A through 6B, reference character R denotes to the right, L denotes to the left, U denotes upward, and D denotes downward. Also, reference numeral 50 refers to a case where a pointing signal is input by rubbing the surface of a virtual touch pad, and 51 refers to a case where a pointing signal is not input when performing the same rubbing operation in the air. In FIGS. 5A through 6B, signals output from the accelerometer 10 are illustrated in the middle, while signals obtained by preprocessing the output signals of the accelerometer 10 are illustrated in the bottom. Referring to FIGS. 5A through 6B, micro-collisions can be detected from the y-axis signals. Also, a direction and a distance in which the finger moves can be known from the x- and y-axis signals. In view of the preprocessed signal of the y-axis acceleration signal, it can be seen whether or not micro-collisions for pointing occur.

FIGS. 6A and 6B are obtained when the finger moves up and down from left to right on the virtual touch pad. Thus, FIGS. 6A and 6B each show a signal waveform corresponding to both x-axial motion (from left to right) and y-axial motion (up and down) in x- and y-axis elements $S_x$ and $S_y$ of the preprocessed signal. Since both the x- and y-axis motions are activated by the micro-collisions, peak signals are caused in the y-axis element $S_y$ of the preprocessed signal.

Figure 7A:
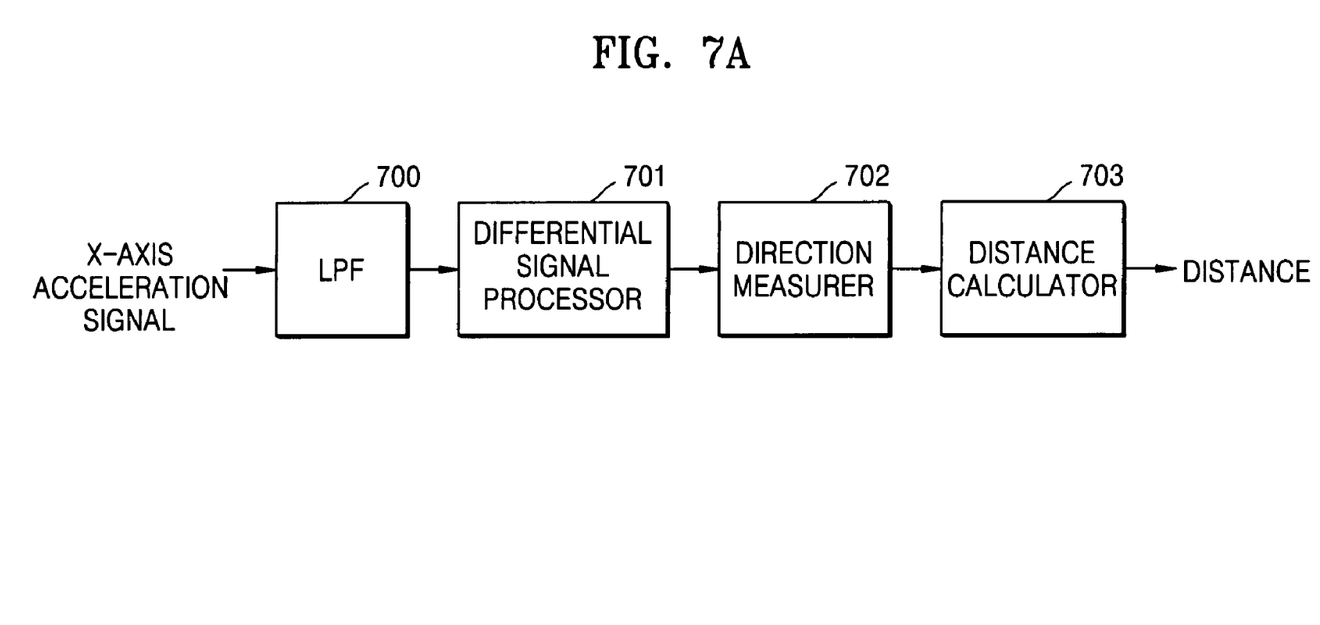
FIG. 7A shows an x-axis acceleration signal processing unit.
Figure 7B:
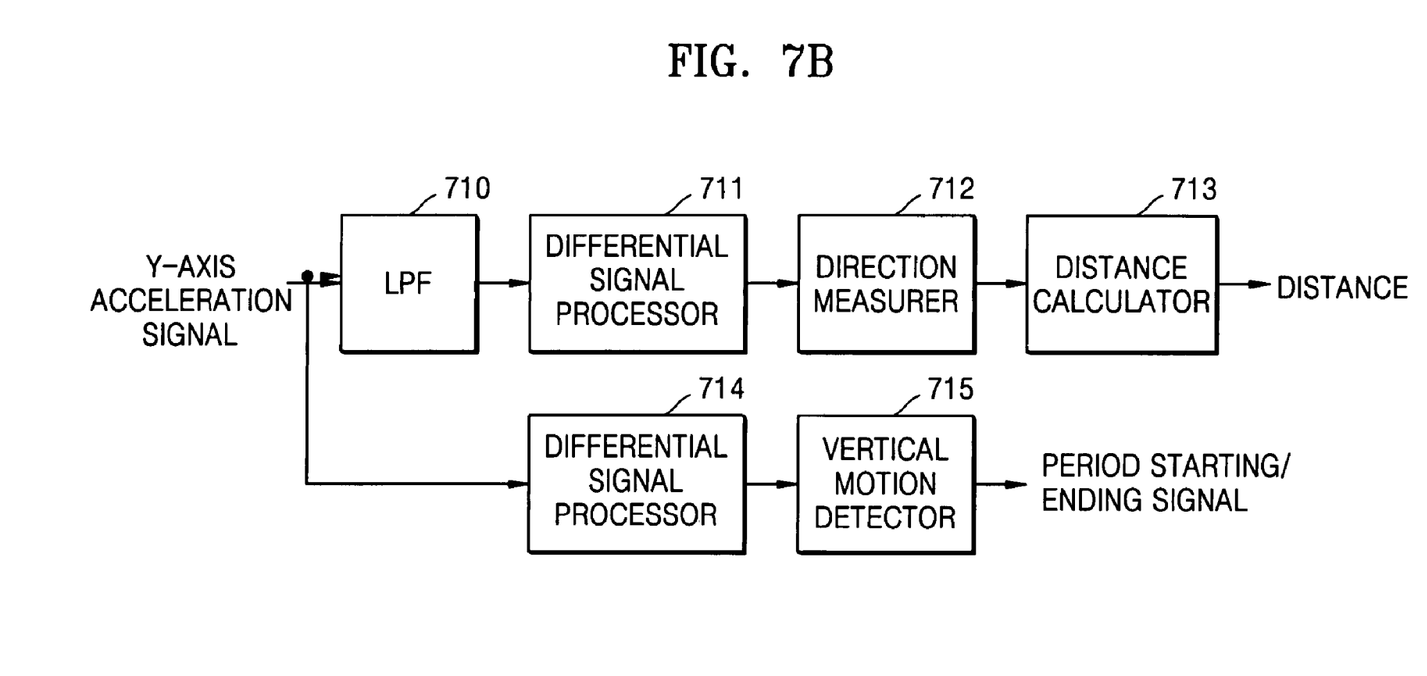
FIG. 7B shows a y-axis acceleration signal processing unit.

FIGS. 7A and 7B are detailed block diagrams of a signal processing unit. FIG. 7A shows an x-axis acceleration signal processing unit, which processes an x-axis acceleration signal of the accelerometer 10 and outputs an x-axis pointing signal, while FIG. 7B shows a y-axis acceleration signal processing unit, which processes a y-axis acceleration signal and outputs a y-axis pointing signal. The x-axis acceleration signal processing unit outputs a direction and a distance in which a finger moves on the x-axis as the pointing signal. The y-axis acceleration signal processing unit outputs a direction and a distance in which the finger moves on the y-axis as the pointing signal.

Referring to FIG. 7A, the x-axis acceleration signal processing unit includes a low pass filter (LPF) 700, a differential signal processor 701, a direction measurer 702, and a distance calculator 703. The LPF 700 passes only a low-frequency signal from the x-axis acceleration signal to smooth the x-axis acceleration signal. The differential signal processor 701 outputs a differential signal from the smoothed x-axis acceleration signal. Here, the differential signal is obtained by subtracting an x-axis acceleration value measured at a previous sampling time from an x-axis acceleration value measured at a present sampling time. The direction measurer 702 measures the direction in which the finger moves according to a pattern of a series of the differential signal, for example, whether the direction is +x-axial direction or −x-axial direction. The distance calculator 703 calculates the distance along which the finger moves by accumulating absolute displacement values for a time axis of the differential signal.

Referring to FIG. 7B, the y-axis acceleration signal processing unit includes an LPF 710, a differential signal processor 711, a direction measurer 712, and a distance calculator 713. Except for the input of a y-axis acceleration signal, the LPF 710, the differential signal processor 711, the direction measurer 712, and the distance calculator 713 operate in the same manner as in the x-axis acceleration signal processing unit of FIG. 7A. The y-axis acceleration signal processing unit further includes a differential signal processor 714 and a vertical motion detector 715 to detect a stroke. The signal processor 714 outputs a differential signal in response to the y-axis acceleration signal output from the accelerometer 10, and the vertical motion detector 715 detects a peak signal caused by a micro-collision in response to the differential signal.

Figure 8:
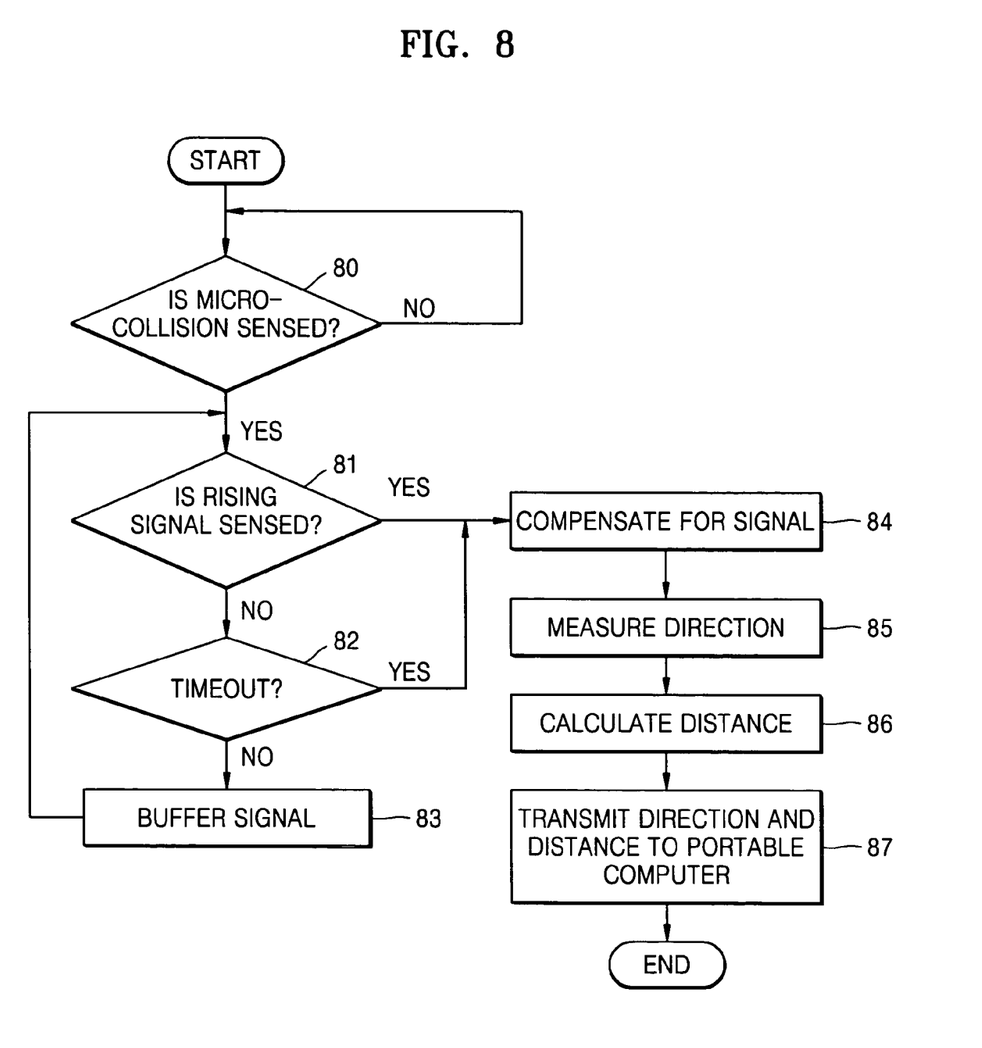
FIG. 8 is a flowchart illustrating a process of calculating a distance in which a finger moves.

FIG. 8 is a flowchart illustrating a process of calculating a distance in which a finger moves.

In operation 80, a peak signal generated at the moment the finger contacts a virtual touch pad is sensed from a y-axis acceleration signal. In operation 81, pointing is activated, and a rising signal generated at the moment the finger leaves the surface of the virtual touch pad is sensed. If the rising signal is not sensed for a predetermined amount of time, for example, for several ms in operation 82, since the finger remains in contact with the virtual touch pad, a present signal is buffered in operation 83 until the rising signal is sensed. That is, sampled signals are buffered while the finger is stroking the virtual touch pad once. If the rising signal is sensed in operation 81, the signal buffered during operations 80 and 81 is smoothed and compensated using the differential signal in operation 84. Unless the rising signal is sensed for the predetermined amount of time in operation 82, the pointing activation period compulsorily comes to an end, and operation 84 is performed. If the compensation is finished, a direction in which the finger moves is measured from the compensated signal in operation 85, a distance in which the finger moves is calculated in operation 86, and the obtained direction and distance are transmitted to a portable computer in operation 87.

When the pointing apparatus is used along with a typical keyboard, it is necessary to distinguish typewriting using the keyboard from pointing in order to prevent misinput. The distinction between typewriting and pointing can be embodied using various methods. For example, the ring type pointing apparatus 1 according to the present invention may further include a rotary switch (not shown), which is turned on or off when typewriting or pointing starts and informs the portable computer of which operation is being performed.

In another embodiment, a weak damping effect of a keyboard due to springs or membranes can be utilized. As a result of analysis of an acceleration signal, unless the damping effect occurs, motion of the finger is not regarded as pointing. However, in keyboards of some ultrathin portable computers, which do not have deep enough key strokes and reveal extremely weak damping effects unlike typical keyboards, it is not easy to use the foregoing method.

In still another embodiment, motion of a finger in a region of a virtual touch pad 3 can be detected using an RF signal or an infrared ray. The present embodiment will be described in detail with reference to FIG. 9.

Figure 9:
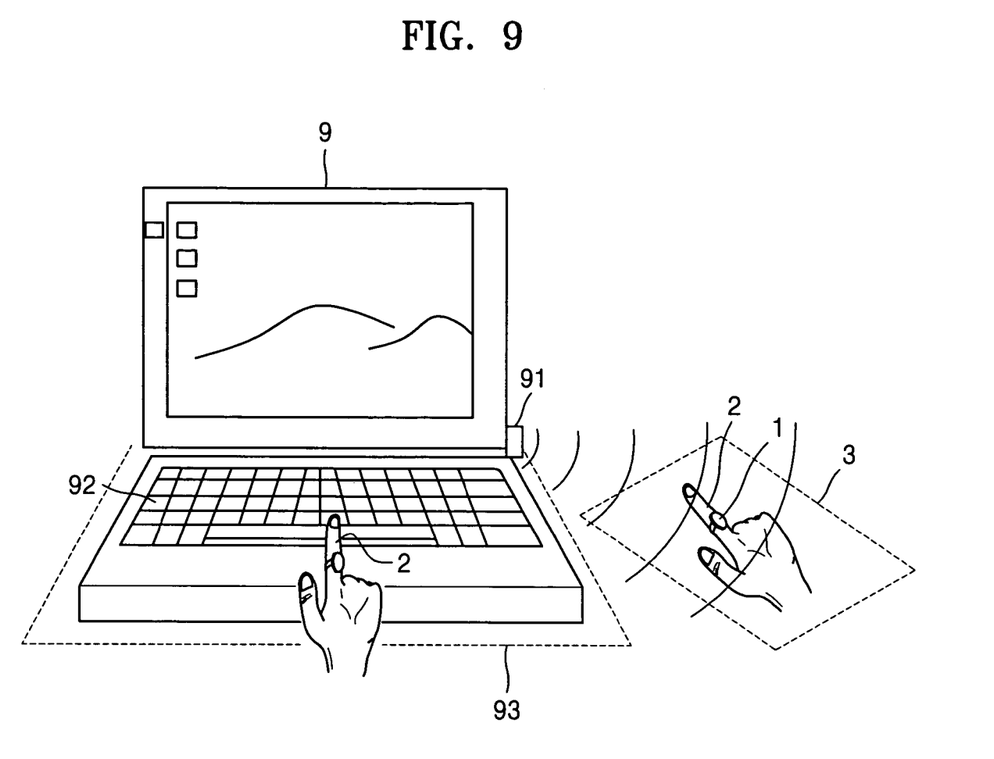
FIG. 9 illustrates an operation of the present invention.

FIG. 9 illustrates an operation for distinguishing typewriting from pointing using an RF signal. Although FIG. 9 illustrates use of the RF signal, it can be also applied to methods using infrared rays.

Referring to FIG. 9, a portable computer 9 includes an RF module 91, which is included in a certain portion of the portable computer 9 and outputs an RF signal. Here, a plurality of RF modules may be positioned in a plurality of portions of the portable computer 9.

To distinguish typewriting from pointing, in the present embodiment, an activation region and a deactivation region of the pointing apparatus are considered. The activation region is a certain region to which an RF signal is transmitted. When the pointing apparatus 1 moves into the activation region, it is activated. For example, once the pointing apparatus 1, which has been turned off, moves onto the virtual touch pad 3, it is turned on. Here, the virtual touch pad 3 refers to a bottom of a region that can sense an RF signal output from the RF module 91. In an alternative embodiment the reference number 91 refers to an infrared generating module 91. The pointing apparatus 1 outputs a pointing signal to the portable computer 9 in response to the RF signal. The portable computer 9 receives the pointing signal from the pointing apparatus 1 and performs coordinate transformation on a screen like a typical mouse operation.

If the pointing apparatus 1 moves onto a keyboard 92 to which an RF signal is not transmitted, it becomes deactivated. Thus, the portable computer 9 senses that typewriting is performed through the keyboard 92.

Inversely, once the pointing apparatus 1, which has been turned on, moves into the deactivation region 93, to which RF signals are not transmitted, it becomes turned off. When the pointing apparatus 1 is turned off and outputs no pointing signal, the portable computer 9 senses that typewriting is performed through the keyboard 92. In this case, bottom surface adjacent to the portable computer 9 except the deactivation region 93 may become a virtual touch pad. That is, if the pointing apparatus 1 deviates from the deactivation region 93, it outputs a pointing signal to the portable computer 9 in response to the RF signal. The portable computer 9 receives the pointing signal from the pointing apparatus 1 and performs coordinate transformation on the screen like a typical mouse operation.

According to the present invention, the pointing apparatus has a ring shape so that portability can be maximized. Also, the pointing apparatus does not occupy a palm-rest area of a touch pad, but can be used on any flat plane just like a mouse. Also, the present invention can distinguish typewriting from pointing using, for example, a switch, a damping effect of a keyboard, RF signals, or infrared rays, thereby preventing misinputs. Further, since it is possible to discern pointing from typewriting by sensing micro-collisions generated in the instant a finger contacts a virtual touch pad, no additional sensors except a 2-axis accelerometer is required to measure 2-dimensional motion. Accordingly, the pointing apparatus of the present invention is economical, small-sized, and less power-consuming.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A pointing apparatus, which inputs a movement signal to a portable computer, the apparatus comprising:
    an accelerometer disposed on a finger and outputting an acceleration signal in response to a motion of the finger; and
    a signal processing unit sensing micro-collisions generated when the finger comes into contact with a contact surface and a rising signal generated when the finger is detached from the contact surface, using the acceleration signal, sensing the motion of the finger between a generation of the micro-collisions and a generation of the rising signal, and outputting the movement signal.

2. The apparatus of claim 1, wherein the accelerometer is a 2-axis accelerometer that measures an x-axis acceleration signal and a y-axis acceleration signal.

3. The apparatus of claim 2, wherein the signal processing unit comprises:
    a first differential signal processor differentiating a previously input y-axis acceleration signal from a presently input y-axis acceleration signal to generate a differential y-axis acceleration signal;
    a vertical motion detector detecting a vertical motion from the differential y-axis acceleration signal and sensing whether or not the micro-collisions occur; and
    a movement signal detector sensing the motion of the finger from the x-axis and the y-axis acceleration signals and outputting the movement signal.

4. The apparatus of claim 3, wherein the movement signal detector comprises:
    two low pass filters smoothing the x-axis and the y-axis acceleration signals, respectively;
    a second differential signal processor and a third differential signal processor, each of the second and the third differential signal processors differentiating a signal previously output from a corresponding one of the two low pass filters from a signal presently output therefrom, to generate respective differential signals;
    two motion direction measurers measuring directions in which the finger moves using the respective differential signals; and
    two distance calculators calculating distances in which the finger moves from the respective differential signals based on the directions in which the finger moves.

5. The apparatus of claim 4, wherein the distance calculator accumulates absolute displacement values relative to a time axis of each differential signal.

6. The apparatus of claim 1, further comprising a first RF module converting the movement signal into a first RF signal and outputting the first RF signal to the portable computer.

7. The apparatus of claim 6, further comprising a sensor, wherein when a second RF module is installed on a portion of the portable computer and outputs a second RF signal, the sensor senses the second RF signal, and wherein only when the sensor senses the second RF signal, the first RF module is activated.

8. The apparatus of claim 6, further comprising a sensor, wherein when second RF modules are installed on various portions of the portable computer and output second RF signals, the sensor senses the second RF signals, and wherein if the sensor does not sense the second RF signals, the first RF module is deactivated.

9. The apparatus of claim 6, further comprising a sensor, wherein when an infrared generating module is installed on a portion of the portable computer and outputs an infrared signal, the sensor senses the infrared signal, and wherein only when the sensor senses the infrared signal, the first RF module is activated.

10. The apparatus of claim 6, further comprising a sensor, wherein when infrared generating modules are installed on various portions of the portable computer and output infrared signals, the sensor senses the infrared signals, and wherein if the sensor does not sense the infrared signals, the first RF module is deactivated.

11. The apparatus of claim 1, further comprising a sensor, wherein when an RF module is installed on a portion of the portable computer and outputs an RF signal, the sensor senses the RF signal, and wherein only when the sensor senses the RF signal, the signal processing unit is activated.

12. The apparatus of claim 1, further comprising a sensor, wherein when RF modules are installed on various portions of the portable computer and output RF signals, the sensor senses the RF signals, and wherein if the sensor does not sense the RF signals, the signal processing unit is deactivated.

13. The apparatus of claim 1, further comprising a sensor, wherein when an infrared module is installed on a portion of the portable computer and outputs an infrared signal, the sensor senses the infrared signal, and wherein only when the sensor senses the infrared signal, the signal processing unit is activated.

14. The apparatus of claim 1, further comprising a sensor, wherein when infrared modules are installed on various portions of the portable computer and output infrared signals, the sensor senses the infrared signals, and wherein if the sensor does not sense the infrared signals, the signal processing unit is deactivated.

15. The apparatus of claim 1, further comprising a switch connected to the accelerometer and the signal processing unit and activating and deactivating the accelerometer and the signal processing unit in response to an external switching operation.

16. A method of inputting a movement signal to a portable computer using an apparatus mounted on a finger, the method comprising:
    receiving an acceleration signal in response to a motion of the finger;
    sensing micro-collisions generated when the finger comes into contact with a predetermined contact surface, using the acceleration signal;
    sensing a rising signal generated when the finger is detached from the contact surface, using the acceleration signal; and calculating a direction and a distance in which the finger moves from a moment the micro-collisions occur until the rising signal is sensed.

17. The method of claim 16, wherein the sensing the micro-collisions comprises differentiating a previously input acceleration signal from a presently input acceleration signal.

18. The method of claim 16, wherein if the rising signal is not sensed for a predetermined amount of time, the direction and the distance in which the finger moves for the predetermined amount of time are calculated.

19. The apparatus of claim 2, further comprising a movement signal detector comprising:

two low pass filters smoothing the x-axis and the y-axis acceleration signals, respectively;

two differential signal processors, each differential signal processor corresponding to one of the two low pass filters and each differential signal processors differentiating a signal previously output from the corresponding low pass filter from a signal presently output therefrom, to generate respective differential signals;

two motion direction measurers measuring directions in which the finger moves using the respective differential signals; and two distance calculators calculating distances in which the finger moves from the respective differential signals based on the directions in which the finger moves.

\* \* \* \* \*